United States Patent
Shinada

(10) Patent No.: US 9,902,643 B2
(45) Date of Patent: Feb. 27, 2018

(54) PRODUCTION METHOD OF OPTICAL FIBER PREFORM AND PRODUCTION METHOD OF OPTICAL FIBER

(71) Applicant: FURUKAWA ELECTRIC CO., LTD., Tokyo (JP)

(72) Inventor: Seiichi Shinada, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/192,590

(22) Filed: Jun. 24, 2016

(65) Prior Publication Data
US 2016/0304387 A1    Oct. 20, 2016

Related U.S. Application Data

(63) Continuation of application No. PCT/JP2014/084412, filed on Dec. 25, 2014.

(30) Foreign Application Priority Data

Jan. 7, 2014    (JP) .................................. 2014-001245

(51) Int. Cl.
C03B 37/014    (2006.01)

(52) U.S. Cl.
CPC .. C03B 37/01446 (2013.01); C03B 37/01453 (2013.01); *C03B 2201/12* (2013.01)

(58) Field of Classification Search
CPC ........ C03B 37/01446; C03B 37/01453; C03B 37/0146
See application file for complete search history.

(56) References Cited

U.S. PATENT DOCUMENTS

| | | | |
|---|---|---|---|
| 5,656,057 A | * | 8/1997 | Brown .............. C03B 37/01446 65/384 |
| 5,685,889 A | | 11/1997 | Ohga et al. |
| 7,055,345 B2 | | 6/2006 | Tobisaka et al. |
| 2003/0121290 A1 | | 7/2003 | Tobisaka et al. |

(Continued)

FOREIGN PATENT DOCUMENTS

| | | |
|---|---|---|
| JP | 63-30338 | 2/1988 |
| JP | 6-157058 | 6/1994 |

(Continued)

OTHER PUBLICATIONS

International Search Report dated Mar. 24, 2015, in PCT/JP2014/084412 filed on Dec. 25, 2014, (with English Translation).

(Continued)

*Primary Examiner* — Lisa L Herring
(74) *Attorney, Agent, or Firm* — Oblon, McClelland, Maier & Neustadt, L.L.P.

(57) ABSTRACT

A production method of an optical fiber preform includes: forming a porous preform by depositing silica particles at an outer periphery of a core rod; and vitrifying the porous preform by conducting thermal treatment steps. At a first thermal treatment step that is an initial thermal treatment step of the thermal treatment steps, the porous preform is heated so that internal temperatures at two end portions in a longitudinal direction of the porous preform increase before an internal temperature of a center portion in the longitudinal direction increases.

13 Claims, 12 Drawing Sheets

(56) References Cited

U.S. PATENT DOCUMENTS

2005/0144988 A1* 7/2005 Yoon .................. C03B 37/0146
　　　　　　　　　　　　　　　　　　　65/507
2010/0024486 A1　2/2010 Okada

FOREIGN PATENT DOCUMENTS

| JP | 10-338536 | 12/1998 |
| JP | 2001-48567 | 2/2001 |
| JP | 2003-261336 | 9/2003 |
| JP | 2008-179518 | 8/2008 |
| JP | 2010-037125 | 2/2010 |

OTHER PUBLICATIONS

Written Opinion dated Mar. 24, 2015, in PCT/JP2014/084412 filed on Dec. 25, 2014.

* cited by examiner

PRODUCTION METHOD OF OPTICAL FIBER PREFORM AND PRODUCTION METHOD OF OPTICAL FIBER

CROSS-REFERENCE TO RELATED APPLICATION

This application is a continuation of PCT International Application No. PCT/JP2014/084412 filed on Dec. 25, 2014 which claims the benefit of priority from Japanese Patent Application No. 2014-001245 filed on Jan. 7, 2014, the entire contents of which are incorporated herein by reference.

BACKGROUND

1. Field of the Disclosure

The present disclosure relates to a production method of an optical fiber preform and a production method of an optical fiber.

2. Description of the Related Art

Commonly, silica-glass-based optical fibers are produced by drawing an optical fiber preform made of silica glass. For production methods as such for optical fiber preforms, a vapor-phase axial deposition (VAD) method, an outside vapor-phase deposition (OVD) method, a modified chemical vapor deposition (MCVD) method, a plasma method, or the like is used widely.

In these production methods, optical fiber preforms are produced by using, for example, silicon tetrachloride as a material for the silica glass and making the silicon tetrachloride be subjected to hydrolysis reaction or oxidation reaction.

An optical fiber preform includes a column-shaped parallel portion having an approximately constant outer diameter and tapered portions connected to an upper end and a lower end of this parallel portion. The upper-end tapered portion expands its outer diameter downwardly and gradually to be connected to the parallel portion, and the lower-end tapered portion expands its outer diameter upwardly and gradually to be connected to the parallel portion.

Meanwhile, the tapered portions provided at the end portions of the optical fiber preform are vulnerable to cracking for reasons that the density of deposited silica particles tends to lower, stress tends to occur in a thermal treatment such as a dehydration step, a sintering step, or the like. Therefore, measures for restraining the optical fiber preform from being cracked are provided to the tapered portion in some cases (see Japanese Patent Application Laid-open Publication No. 2010-37125).

Although it is possible to restraining production of a crack by increasing thermal shrink at the tapered portion to increase the density of the silica particles, an attempt of increase in thermal shrink encounters a limitation that another problem occurs such as decentralization of a core or the like.

As described above, the measurement for restraining cracking at the tapered portion is not so sufficient that cracking still occurs at the tapered portion sometimes. To address this, a more effective countermeasure for cracking is required.

There is a need for a production method of an optical fiber preform and a production method of an optical fiber being able to restrain a cracking from being produced.

SUMMARY

A production method of an optical fiber preform may include: forming a porous preform by depositing silica particles at an outer periphery of a core rod; and vitrifying the porous preform by conducting thermal treatment steps, and at a first thermal treatment step that is an initial thermal treatment step of the thermal treatment steps, the porous preform is heated so that internal temperatures at two end portions in a longitudinal direction of the porous preform increase before an internal temperature of a center portion in the longitudinal direction increases.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION

Hereafter Embodiments of a production method of an optical fiber preform and a production method of an optical fiber will be explained in detail with reference to the drawings. Embodiments which will be explained hereafter will not limit the present disclosure.

Basic Embodiment

Figure 1:
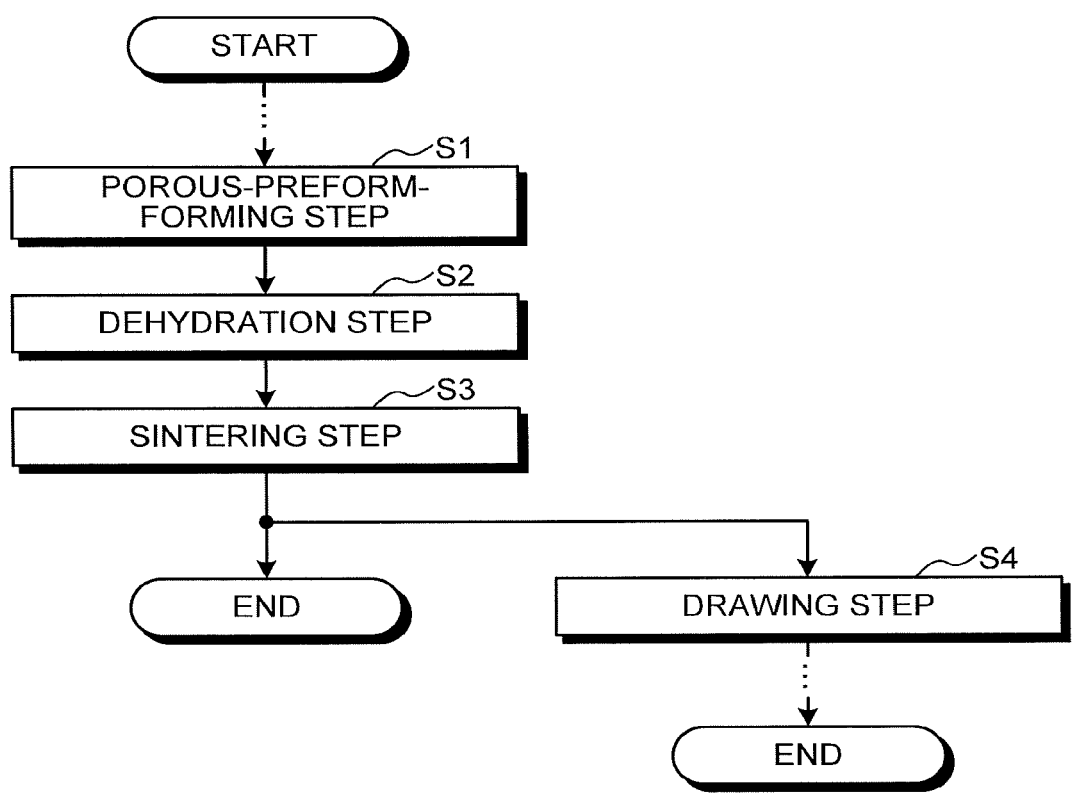
FIG. 1 is a flowchart illustrating an order of steps in a production method of an optical fiber preform and an order of steps in a production method of an optical fiber.

FIG. 1 is a flowchart illustrating an order of steps in a production method of an optical fiber preform and an order of steps in a production method of an optical fiber according to a basic embodiment. FIGS. 2 to 5 are schematic views illustrating a state of a porous preform or the optical fiber preform in each step illustrated in the flowchart of FIG. 1.

The basic embodiment illustrated below will be explained without limiting to any type of a vitrification furnace for use, and embodiments limiting to a certain type of vitrification furnace will be explained later as embodiments separately.

As illustrated in FIG. 1, a production method of an optical fiber preform according to the basic embodiment includes a porous-preform-forming step, a dehydration step, and a sintering step. The production method of the optical fiber according to the basic embodiment further includes a drawing step subsequent to the sintering step of the production method of the optical fiber preform.

The above-described steps of the production method of the optical fiber preform are mere examples, and there may be numerous variations. For example, a main point of the basic embodiment remains the same even if the dehydration step may be divided into a first dehydration step and a second dehydration step, a doping step may be provided between the dehydration step and the sintering step, and the dehydration step and the sintering step may be conducted sequentially and integrally. A step of vitrifying the porous preform by conducting thermal treatment such as the dehydration step, the doping step, and the sintering step by a plurality of times may be referred to a vitrification step collectively.

At the porous-preform-forming step of Step S1, a porous preform Pa is formed by depositing silica-based glass particles (see FIG. 2) at an outer periphery of a column-shaped core rod Rc made of silica-based glass.

For example, a core soot produced by the VAD method, subjected to dehydration and vitrification by the vitrification furnace and extended to a predetermined diameter is used for the core rod Rc. The porous preform Pa is produced by depositing silica-based glass particles at the outer periphery of the core rod Rc by, for example, the OVD method. The core rod Rc includes a portion to be a core when becoming an optical fiber and a portion to be a cladding formed around the core.

Figure 2:
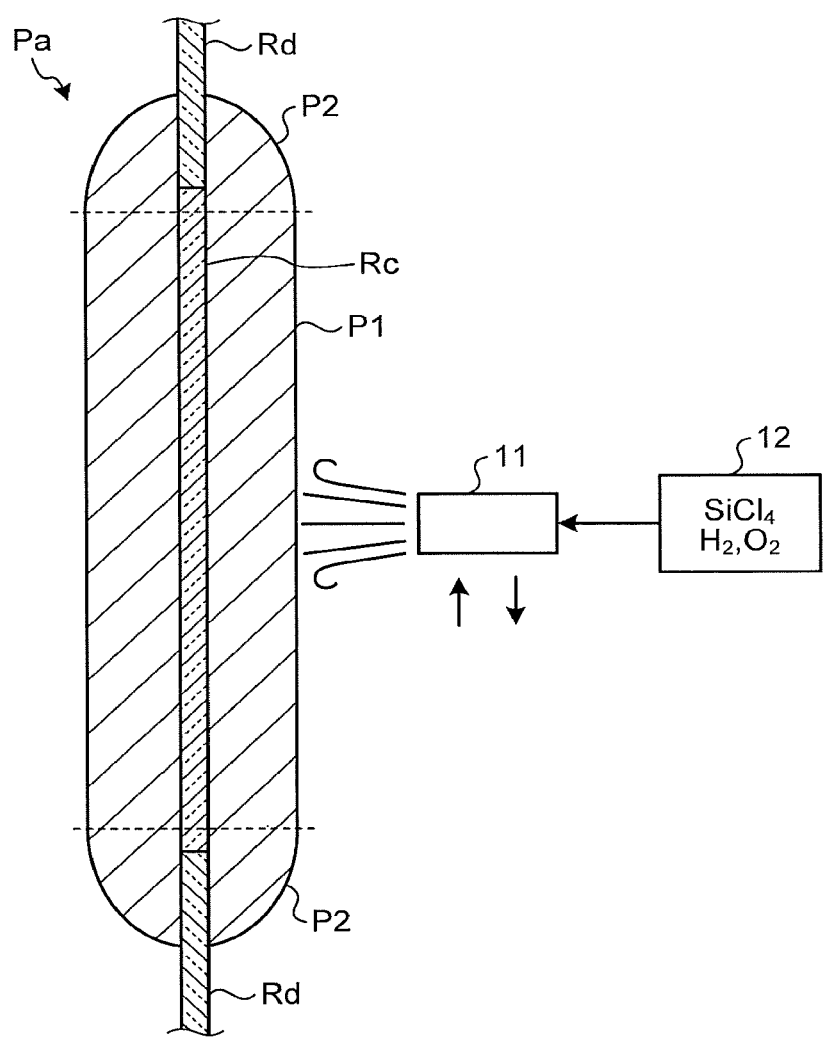
FIG. 2 is a schematic view illustrating a state of a porous preform in a porous-preform-forming step.

As illustrated in FIG. 2, two ends of the core rod Rc in the longitudinal direction are connected to dummy rods Rd. The dummy rods Rd are used as holders holding the porous preform Pa, driving to rotate the porous preform Pa and driving to lift up the porous preform Pa.

When depositing silica-based glass particles by the OVD method, gas 12 containing silicon tetrachloride ($SiCl_4$), oxygen ($O_2$) and hydrogen ($H_2$) that are vaporized is fed by a burner 11, and is ignited and combusted. The $SiCl_4$ subjected to hydrolysis reaction in flames becomes silica particles and is deposited around the core rod Rc. The deposition is repeated until a porous layer P1 of a parallel portion reaches a sufficient thickness by making a position of the burner 11 or the core rod Rc in the longitudinal direction reciprocate repeatedly while rotating the core rod Rc.

As illustrated in FIG. 2, the porous preform Pa is divided into the porous layer P1 at the parallel portion and porous layers P2 at tapered portions. The porous layer P2 at an upper end tapered portion, for which deposition amount is gradually reduced in diameter upwardly, is connected to the dummy rods Rd, and the porous layer P2 at a lower tapered portion, for which deposition amount is gradually reduced in diameter downwardly, is connected to the dummy rods Rd. On the other hand, silica particles, of which thickness is uniform, is deposited to the core rod Rc at the porous layer P1 at the parallel portion. In production, the parallel portion and the tapered portions are distinguished at a border of 95% of an outer diameter of a center position in the longitudinal direction after the sintering. For the purpose of explanation, two ends are identified from each other depending on whether being up side or down side in the longitudinal direction in the drawings. The longitudinal direction of the porous preform is not limited to the vertical direction but may be a horizontal direction.

It is preferable that an average density of the porous layer P1 at the parallel portion (the density of a porous layer is commonly referred to bulk density) be equal to or greater than 0.2 $g/cm^3$ from a view point of increasing the size of the optical fiber preform. If the average bulk density is too low, an outer diameter of the porous preform Pa increases, and thus, a vitrification furnace with the larger outer diameter is necessary. On the other hand, dehydration in the dehydration step is easier when the average bulk density is lower, and the dehydration becomes more difficult exponentially along with an increase in the average bulk density. Therefore, it is preferable that the average bulk density be equal to or smaller than 1.0 $g/cm^3$.

It is preferable that the tapered portions of the porous preform Pa be subjected to thermal shrink by a burner which is other than the burner 11. In that case, the bulk density of the tapered portions of the porous layers P2 is higher than the bulk density of the porous layer P1 at the parallel portion. For example, in comparison to the average bulk density of 0.7 $g/cm^3$ of the entire porous preform Pa, the average bulk density of the tapered portions being subjected to the thermal shrink is 1.0 $g/cm^3$ to 1.5 $g/cm^3$. Although a sufficient dehydration is possible even if the dehydration step and the sintering step are conducted simultaneously and if the bulk density of the porous layer P1 at the parallel portion is low, if the bulk density of the porous layer P1 at the parallel portion is equal to or greater than 0.7 $g/cm^3$, it is difficult to conduct dehydration and sintering simultaneously in one step. To address this, it is preferable that a dehydration step and a sintering step be conducted separately to the porous preform of which density is high.

Figure 3:
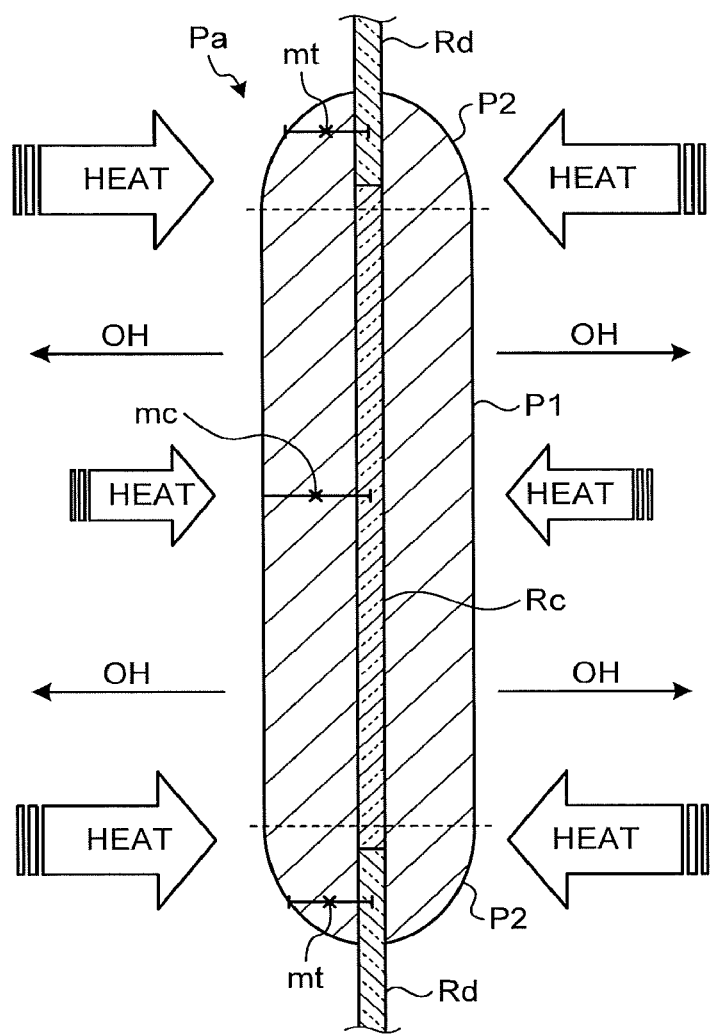
FIG. 3 is a schematic view illustrating a state of the porous preform in a dehydration step.

Then, in a dehydration step at Step S2 being a first thermal treatment step in the vitrification step, as illustrated in FIG. 3, the hydroxyl (OH) is removed from the porous preform Pa in atmosphere of inert gas and halogen gas, or in atmosphere of inert gas and halogen-based compound gas. For an example of atmospheric gas in the dehydration step, mixture gas of helium and chlorine is used general. Explanations below follow an example using mixture gas being atmospheric gas of helium and chlorine.

When separating the dehydration step and the sintering step, a processing temperature at the dehydration step is 900° C. to 1300° C. in general. Moreover, effectivity in dehydration may be increased if it is equal to or higher than 1150° C. From a view point of enabling sufficient dehydration, 1250° C. or lower is preferable since it is possible to restrain a portion of the porous preform Pa from being sintered at the dehydration effect, and thus it is possible to separate the dehydration step from the sintering step reliably.

In the dehydration step at the Step S2, the porous preform is heated so that an internal temperature of two end portions in the longitudinal direction of the porous preform increases prior to an increase in internal temperature of a center portion in the longitudinal direction. For example, as illustrated in FIG. 3, the internal temperature of the two end portions in the longitudinal direction of the porous preform is represented by a temperature at an intermediate position mt between a center axis and a top surface at a position in the longitudinal direction at which the outer diameter of the tapered portions becomes 50% of an outer diameter of the center position in the longitudinal direction. The internal temperature of the center portion in the longitudinal direction is represented by a temperature at a middle position mc between the center axis and the top surface at the center position in the longitudinal direction.

For example, a temperature-rising rate inside the two end portions is controlled to be 4400° C./hr when a temperature-rising rate from normal temperature inside the center portion to a processing temperature of the dehydration step (for example, 1200° C.) is 2040° C./hr, and a temperature-rising rate inside the two end portions is controlled to be 2230° C./hr when a temperature-rising rate inside the center portion is 1115° C./hr. However, if the temperature-rising rate inside the two end portions is too high, since load to equipment increases and thus the equipment is more vulnerable to trouble and since hunting of temperature increases sometimes, it is preferable that the temperature-rising rate be controlled so that the temperature-rising rate inside the two end portions is equal to or less than 6000° C./hr.

In order to restrain production of crack more effectively, it is preferable to heat the porous preform so that a difference between the internal temperature at the two end portions in the longitudinal direction and the internal temperature at the center portion be 400° C. to 800° C. at the maximum and so that the difference between the internal temperature at the two end portions in the longitudinal direction and the internal temperature at the center portion be zero in 30 to 60 minutes after starting the heating. That is, time-to-zero difference between the internal temperature at the two end portions in the longitudinal direction and the internal temperature at the center portion is one fifth to one tenth of the entire dehydration step.

That is, in the dehydration step at the Step S2, as illustrated in FIG. 3, the tapered portions of the porous preform Pa are heated more intensively than at the parallel portion when starting the dehydration step. FIG. 3 illustrates that a larger arrow indicates a larger heat quantity imparted to the porous preform Pa. By heating the porous preform Pa in this manner, the internal temperature at the two end portions in the longitudinal direction of the porous preform increases prior to increase in the internal temperature of the center portion in the longitudinal direction. Since a method of heating the tapered portions of the porous preform Pa more intensively than at the parallel portion varies in accordance with a type of the vitrification furnace being used, it will be explained more specifically below with reference to illustration of the vitrification furnace.

In a sintering step at Step S3 that is the final thermal-processing step in the vitrification step, the porous preform Pa dehydrated at the above-described dehydration step is sintered and reformed to an optical fiber preform Pb. A sintering temperature is, for example, 1400° C. to 1600° C., and is adjusted appropriately in accordance with the used porous preform Pa. At the sintering step, the porous preform Pa is subjected to thermal treatment in an atmosphere containing inert gas such as helium or the like. At the sintering step, the porous preform Pa is heated from one end toward the other end in the longitudinal direction gradually. Alternatively, the porous preform Pa may be heated by total length thereof simultaneously. It is more preferable that, in the sintering step as well, similarly to the above-described dehydration step, the porous preform be heated so that the internal temperature at the two end portions in the longitudinal direction of the porous preform increases prior to the internal temperature of the center portion in the longitudinal direction.

Figure 4:
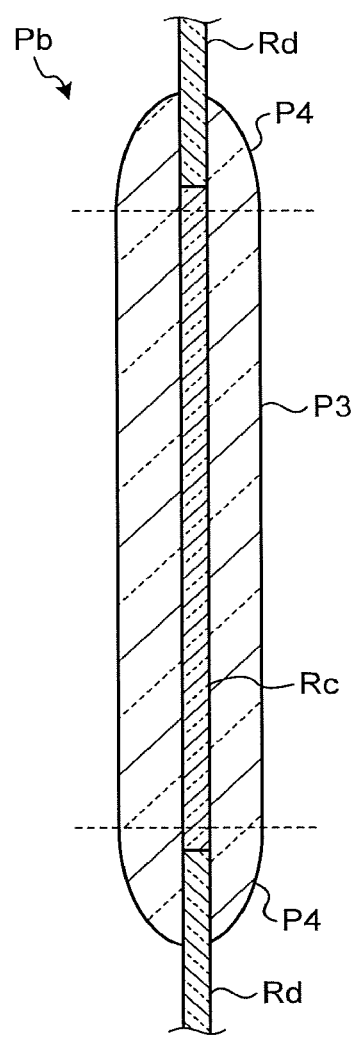
FIG. 4 is a schematic view illustrating a state of the optical fiber preform in a sintering step.
Figure 5:
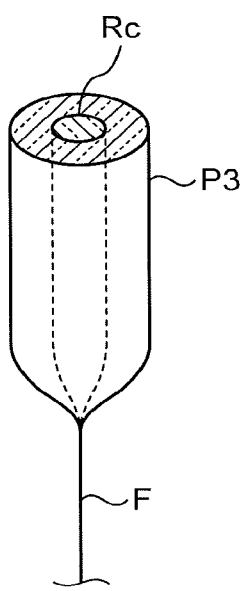
FIG. 5 is a schematic view illustrating a state of the optical fiber preform in a drawing step.

As illustrated in FIG. 4, in the sintering step at the Step S3, as a result of sintering the porous layers P1 and P2 of the porous preform Pa, the deposited glass particles are vitrified and contracted in volume. A glass layer P3 being as a result of sintering the porous layer P1 at the parallel portion becomes a cladding when an optical fiber is produced, and a glass layer P4 as a result of sintering the porous layers P2 at the tapered portions becomes a non-product portion.

When a thermal treatment temperature at the first thermal treatment step in the vitrification step is equal to or higher than 1400° C. like a case of conducting, for example, the dehydration step and the sintering step simultaneously, frequency of producing cracking is very few. It is estimated that the cracking is caused by a stress applied to the porous preform contracted or expanded by heat. When heating the porous preform to equal to or higher than 1400° C. at a time, it is considered that a stress applied to the porous preform is released because the sintering progresses simultaneously although the stress is applied to the porous preform by heat.

Therefore, the production of cracking is a problem caused mainly when the thermal treatment temperature of the first thermal treatment step in the vitrification step is lower than 1400° C. Since it is preferable to conduct the dehydration step and the sintering step separately in the vitrification step of the porous preform of which bulk density is high, it is preferable to make the thermal treatment temperature at the first thermal treatment step in the vitrification step equal to or lower than 1300° C. that is lower than 1400° C. As a result, the production of cracking is a problem evident in the vitrification step of the porous preform of which bulk density is high.

As explained in the above, a fluorine-doping step or the like may be inserted between the dehydration step at the Step S2 and the sintering step at the Step S3, the step as such will be explained in Embodiments below.

After finishing the sintering step at the Step S3, in the production method of the optical fiber preform according to the basic embodiment, the production process is finished. On the other hand, in the production method of the optical fiber according to the basic embodiment, the method moves to a drawing step at Step S4. In this drawing step, the optical fiber preform Pb is subjected to heating and melting to be drawn into an optical fiber F having a desirable outer diameter (see FIG. 5).

First Embodiment

Hereafter, with reference to FIGS. 6 and 7, a production method of an optical fiber preform and a production method of an optical fiber preform according to a first embodiment will be explained. Hereafter, explanations will be omitted for configurations and properties that are identical to those of the above-described basic embodiment. That is, unless otherwise specified, a portion not explained in the present Embodiment is common with that of the basic embodiment.

Figure 6:
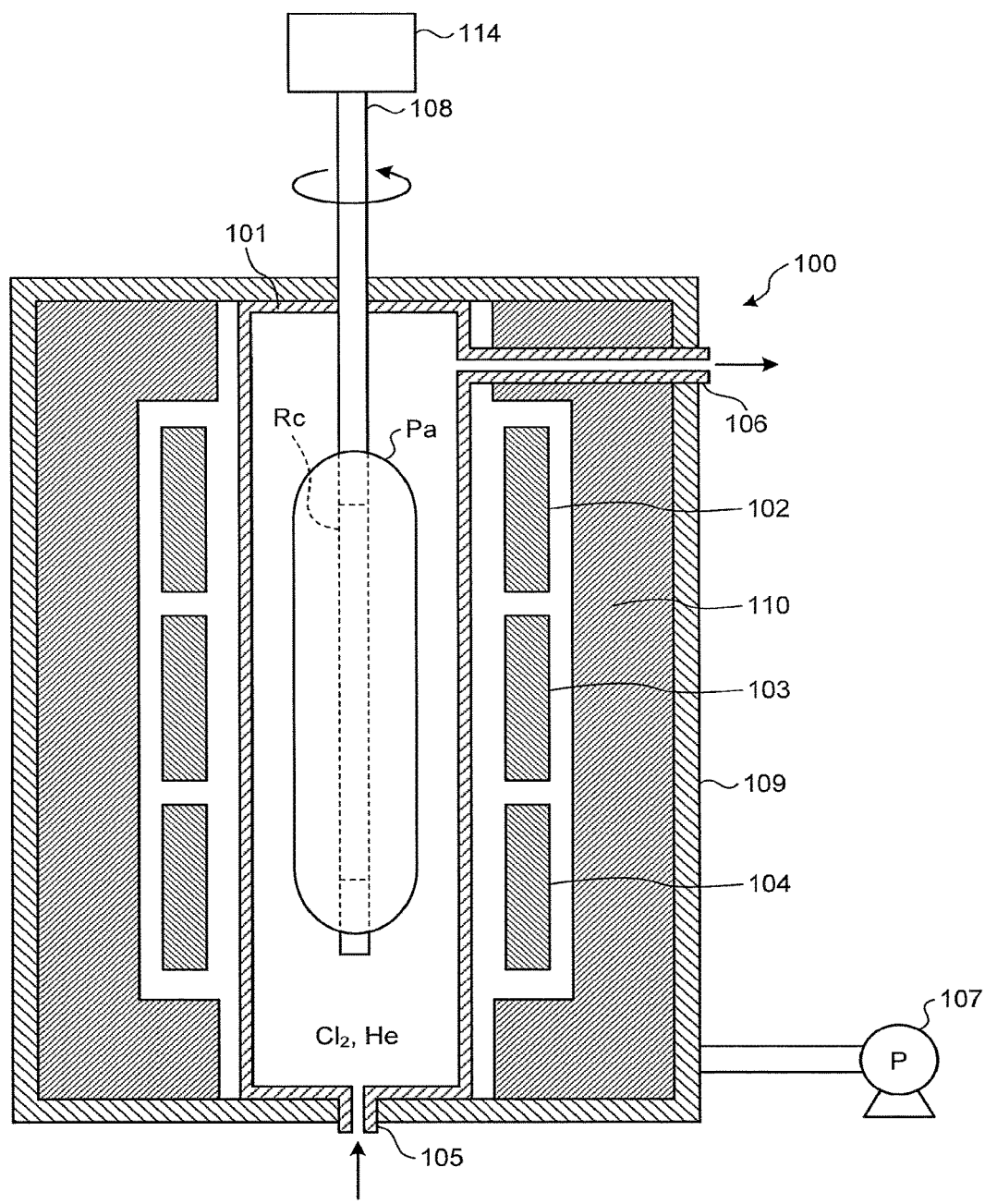
FIG. 6 is a view illustrating a schematic configuration of a multi-stage-heating vitrification furnace.

FIG. 6 is a view illustrating a schematic configuration of a multi-stage-heating vitrification furnace as an example of a vitrification furnace used for a production method of an optical fiber preform and a production method of an optical fiber according to the first embodiment. The multi-stage-heating vitrification furnace illustrated in FIG. 6 is used in the dehydration step and the sintering step in the production method of the optical fiber preform and the production method of the optical fiber according to the first embodiment. When providing a doping step between the dehydration step and the sintering step, the multi-stage-heating vitrification furnace is used in the doping step as well.

As illustrated in FIG. 6, a multi-stage-heating vitrification furnace 100 includes: a silica reactor core tube 101 that is a sealable vessel made of silica glass; and a plurality of ring-shaped heaters 102, 103 and 104 that are heating elements provided around the silica reactor core tube 101. The silica reactor core tube 101 and the heaters 102, 103 and 104 are covered entirely with a furnace body 109, and a heat insulation material 110 is provided among the furnace body 109 and the heaters 102, 103 and 104.

The first heater 102, the second heater 103, and the third heater 104 may be controlled independently, and their setting temperatures and temperature-rising rates may be controlled differently. Although the multi-stage-heating vitrification furnace 100 illustrated in FIG. 6 is configured to have three heaters, the embodiments according to the present disclosure are not limited to the specific number of heaters. However, it is preferable that the heaters be configured to be capable of setting temperature differences between the two end portions and the center portion easily, for example, a configuration being provided with equal to or greater than three heaters in odd number, a configuration being provided with heaters disposed upward and downward for heating the two end portions, or the like are preferable.

As illustrated in FIG. 6, the silica reactor core tube 101 has a volumetric capacity capable of containing the porous preform Pa thereinside and heats the porous preform Pa contained thereinside by the first heater 102, the second heater 103 and the third heater 104. The first heater 102, the second heater 103 and the third heater 104 are disposed along the longitudinal direction of the porous preform Pa when the porous preform Pa is contained in the silica reactor core tube 101. The first heater 102, the second heater 103 and the third heater 104 heat an upper stage, a middle stage and a lower stage of the porous preform Pa respectively. The porous preform Pa contained in the silica reactor core tube 101 is driven and rotated by a rotating-and-lifting device 114 via a support bar 108. Although the rotating-and-lifting device 114 is capable of setting a rotation speed and a rising/lowering speed, in this Embodiment, the porous preform Pa is not lifted or lowered during a thermal treatment, and the porous preform Pa, in a state of being disposed at a predetermined position in the silica reactor core tube 101, is merely rotated for thermal treatment.

When outputs of the first heater 102 and the third heater 104 increase more than output from the second heater 103, the porous preform Pa is heated at the two end portions more intensely than at the center portion, and as a result, the internal temperature at the two end portions of the porous preform Pa increases prior to the internal temperature at the center portion.

Therefore, the multi-stage-heating vitrification furnace 100 illustrated in FIG. 6 has a configuration which is preferable to conduct a dehydration step so that the internal temperature at the two end portions in the longitudinal direction of the porous preform Pa increases prior to the internal temperature at the center portion in the longitudinal direction.

Moreover, a gas introduction port 105 and a gas-exhausting port 106 being provided to the silica reactor core tube 101 are capable of introducing, for example, chlorine ($Cl_2$) having a dehydration effect and helium (He) being inert gas into the silica reactor core tube 101. Hereby the porous preform Pa contained in the silica reactor core tube 101 can be dehydrated.

Gas being introduced into the silica reactor core tube 101 via the gas introduction port 105 is not limited to this kind, and when doping the porous preform Pa with fluorine, gas containing fluorine including silicon tetrafluoride ($SiF_4$) or the like is introduced. Alternatively, nitrogen ($N_2$) may be used in place of helium.

Moreover, a vacuum pump 107 may be connected to the silica reactor core tube 101 to conduct thermal treatment of the porous preform Pa while decompressing inside the silica reactor core tube 101.

Figure 7:
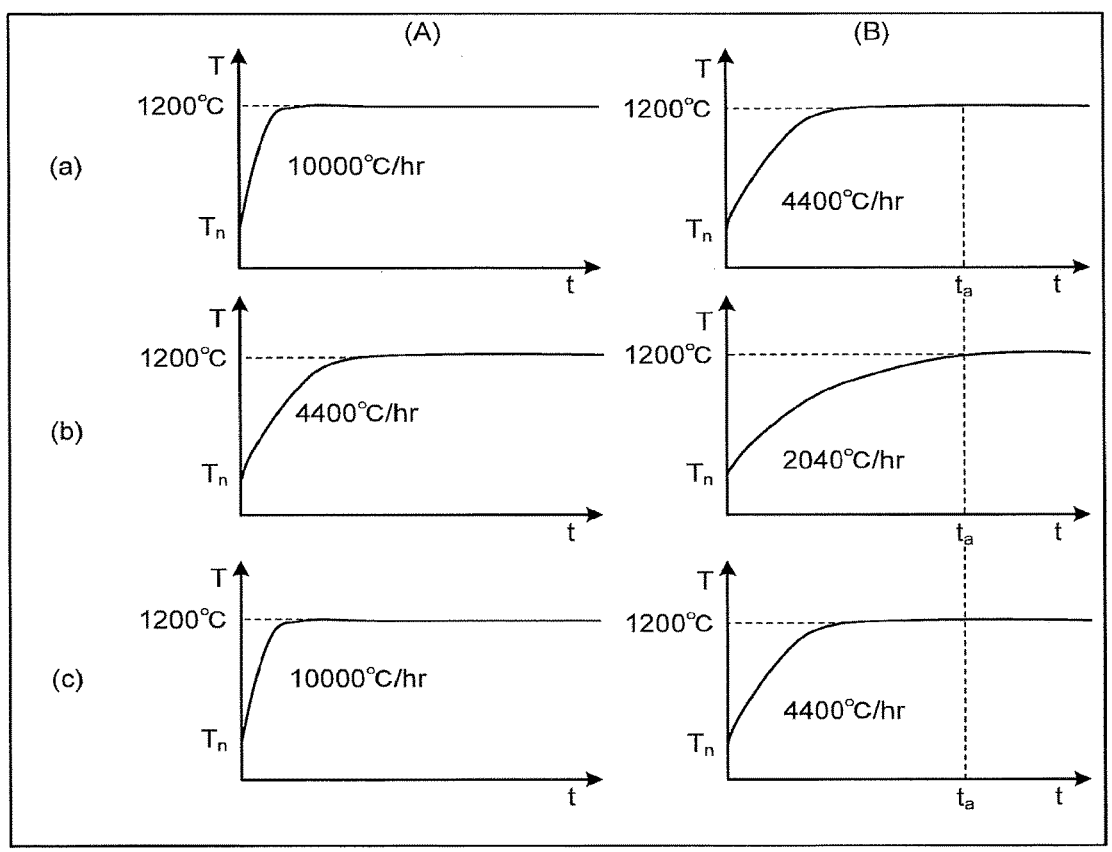
FIG. 7 is a graph illustrating examples of temperature histories in the dehydration step according to a first embodiment.

FIG. 7 illustrates a graph illustrating examples of temperature histories according to the first embodiment. In the graph illustrated in FIG. 7, horizontal axes indicate time t for the dehydration step and vertical axes indicate temperature T. The temperature histories illustrated in FIG. 7 relate to (A) preform surfaces and (B) inside preforms of the porous preforms, for each of them, (a) upper stage, (b) middle stage, and (c) lower stage relating to the longitudinal direction of the porous preform are described. As illustrated in previously explained FIG. 3, temperatures in (B) inside preform at the (a) upper stage and the (c) lower stage are temperature at the middle position mt between the center axis and the top surface at the position in the longitudinal direction where the outer diameter of the tapered portions becomes 50% of the outer diameter of the parallel portion, and temperature of the (B) inside preform at the (b) middle stage is a temperature at the middle position mc between the center axis and the top surface at the center position in the longitudinal direction.

As understood from the temperature histories at the (A) preform surface illustrated in FIG. 7, in the dehydration step according to the first embodiment, surface temperatures at the (a) upper stage and the (c) lower stage of the porous preform increase prior to that of the (b) middle stage. More specifically, the surface temperatures at the (a) upper stage and the (c) lower stage of the porous preform increase from normal temperature $T_n$ to 1200° C. by a rate of 10000° C./hr, and by contrast, the (b) middle stage increases in temperature from the normal temperature $T_n$ to 1200° C. by a rate of 4400° C./hr. This is because, as described above, in the dehydration step according to the first embodiment, the outputs of the first heater 102 and the third heater 104 of the multi-stage-heating vitrification furnace 100 are greater than the output of the second heater 103.

Moreover, as understood from the temperature history of the (B) inside preform, in the dehydration step according to the first embodiment, the internal temperatures at the (a) upper stage and the (c) lower stage of the porous preform increase prior to the (b) middle stage. More specifically, the internal temperatures at the (a) upper stage and the (c) lower stage of the porous preform increase from normal temperature $T_n$ to 1200° C. by the rate of 4400° C./hr, and by contrast, the (b) middle stage increases in temperature from the normal temperature $T_n$ to 1200° C. by a rate of 2040° C./hr.

In this state, a difference of temperatures of the (B) inside preform between the (a) upper stage and the (c) lower stage, and the (b) middle stage is 600° C. at maximum, and a difference between the internal temperature at the two end portions in the longitudinal direction and the internal temperature at the center portion became zero subsequent to $t_a$=45 minutes after starting the heating.

When inspecting rate of occurrence of cracking at the porous preform having the above-described temperature history and being subjected to dehydration step, results below were obtained. The porous preform used for the inspection was produced by depositing a porous layer of which average bulk density is 0.65 g/cm³ at an outer periphery of a core rod of which outer diameter is 50 mm and of which length is 2000 mm by the OVD method. An outer diameter of the parallel portion of the porous preform being produced is 270 mm. When conducting the dehydration step for five hours in dehydration time to this porous preform of which temperature history is described above, the rate of occurrence of cracking was equal to or lower than 0.1%, and this indicated a significant effect in comparison to Comparative Example which will be explained later.

Second Embodiment

Hereafter, a production method of an optical fiber preform and a production method of an optical fiber according to a second Embodiment will be explained with reference to FIGS. 8 to 11. However, similarly to the first embodiment, explanations will be omitted for configuration and nature that are identical to those of the basic embodiment.

Figure 8:
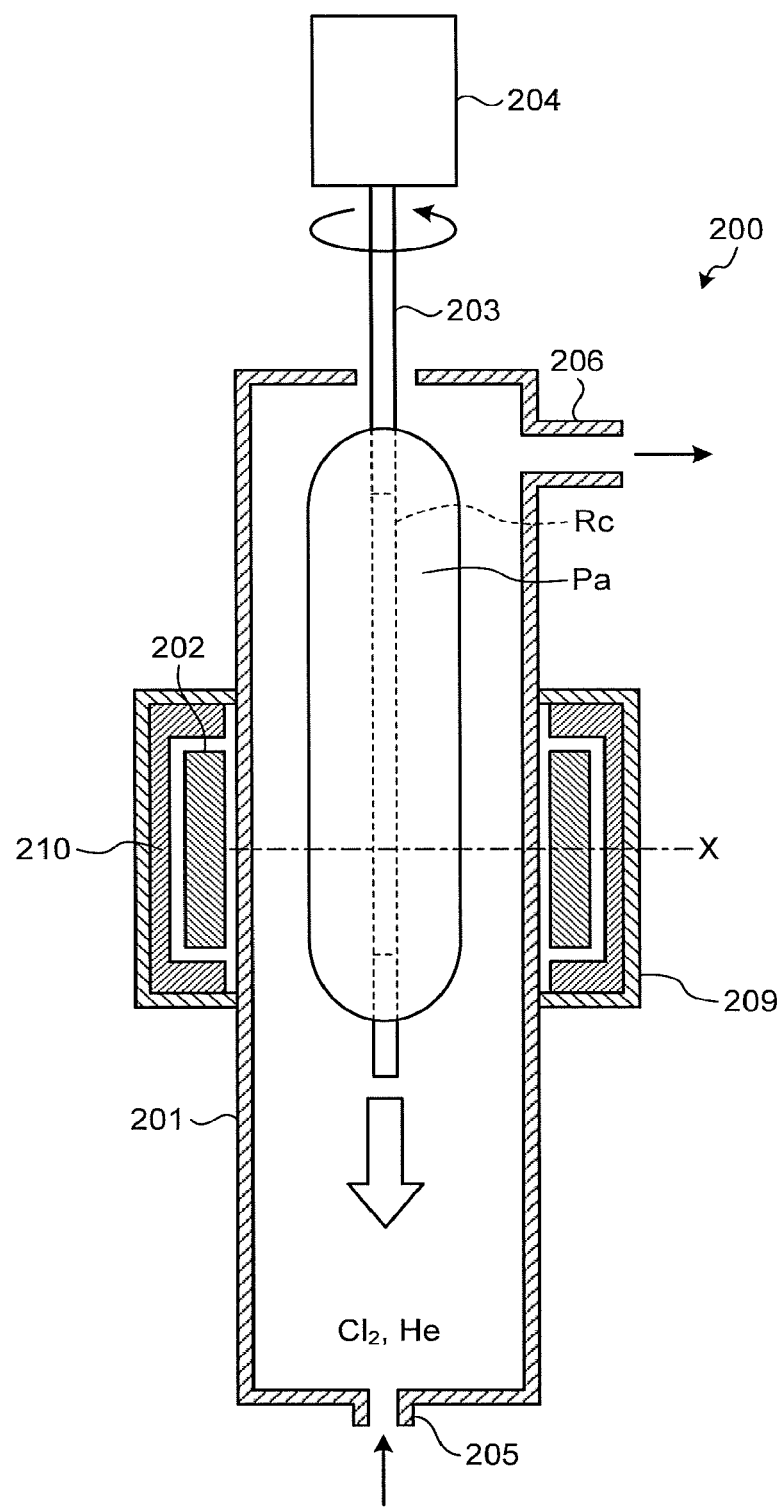
FIG. 8 is a view illustrating a schematic configuration of a stroke-type vitrification furnace.

FIG. 8 is a schematic configuration of a stroke-type vitrification furnace as an example of a vitrification furnace used for the production method of the optical fiber preform and the production method of the optical fiber according to the second embodiment. The stroke-type vitrification furnace illustrated in FIG. 8 is used in a dehydration step and a sintering step in the production method of the optical fiber preform and the production method of the optical fiber according to the second embodiment. When providing a doping step between the dehydration step and the sintering step, the stroke-type vitrification furnace is used in the doping step as well.

As illustrated in FIG. 8, a stroke-type vitrification furnace 200 includes a silica reactor core tube 201 that is a sealable vessel made of silica glass and a ring-shaped heater 202 that is a heating element provided around this silica reactor core tube 201. The heater 202 is provided for heating a predetermined range disposed upward and downward of a highest-temperature position X of the silica reactor core tube 201 and is covered with a furnace body 209 entirely. A heat insulation material 210 is provided between a furnace body 209 and the heater 202.

The silica reactor core tube 201 has volumetric capacity and length capable of containing the porous preform Pa thereinside and making the entire length of a portion of the porous preform Pa as product positioned at the highest-temperature position X, and the porous preform Pa contained thereinside is held by a rotating-and-lifting device 204 via a support bar 203 from outside the silica reactor core tube 201.

The rotating-and-lifting device 204 makes the porous preform Pa contained thereinside driven to rotate, lift up, and lower to conduct a movement of varying a position of the porous preform Pa relative to the heater 202. The rotating-and-lifting device 204 is capable of controlling rotation speed and rising/lowering speed. The stroke-type vitrification furnace 200 may be of a method of lifting up and lowering the heater 202 but not of a method of lifting up and lowering the porous preform Pa. The present embodiment may be applied to the method of lifting up and lowering the heater 202 as well.

Moreover, a gas introduction port 205 and a gas-exhausting port 206 are provided to the silica reactor core tube 201 being capable of introducing, for example, $Cl_2$ and He into the silica reactor core tube 201. Gas being introduced into the silica reactor core tube 201 via the gas introduction port 205 is not limited to this kind, and when doping the porous preform Pa with fluorine, it is used to introduce gas containing fluorine including silicon tetrafluoride ($SiF_4$) or the like. Alternatively, $N_2$ may be used in place of He.

Figure 9:
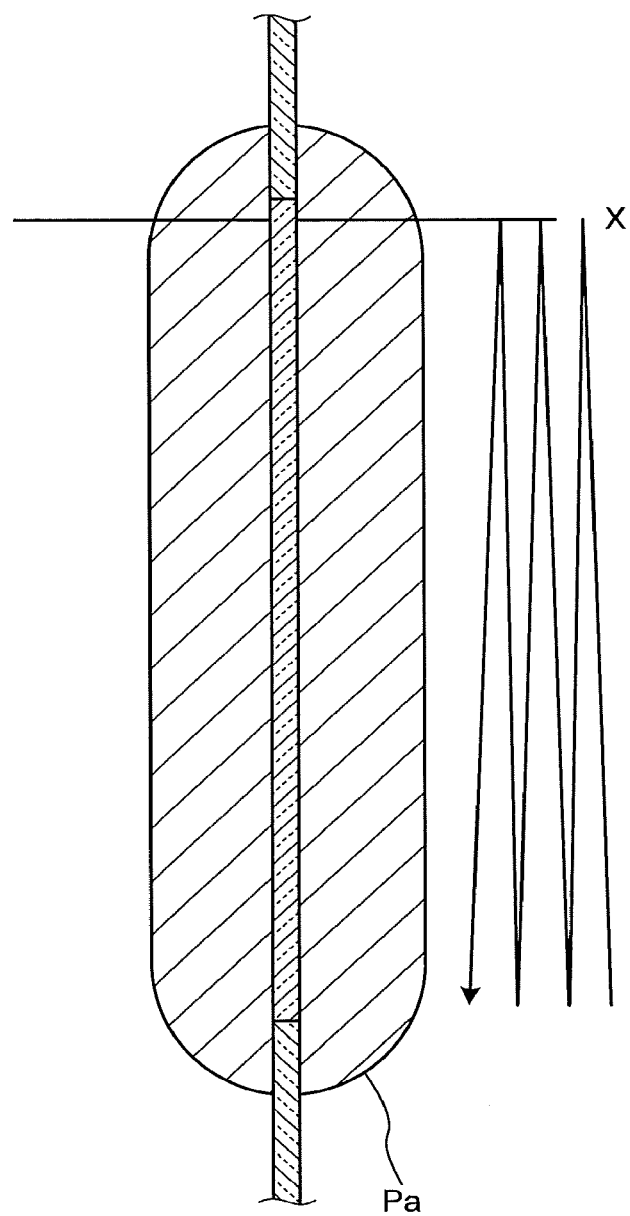
FIG. 9 is a view explaining a heating method for the porous preform in a second embodiment conceptually.

FIG. 9 is a view conceptually explaining a method of heating the porous preform of the second embodiment. In FIG. 9, an arrow indicates a track of the highest-temperature position X of the heater 202 relative to the longitudinal direction of the porous preform Pa. As illustrated in FIG. 9, in the second embodiment, the porous preform Pa is heated by making the a position of the highest-temperature position X relative to the porous preform Pa be reciprocated repeatedly in the longitudinal direction. That is, when using the vitrification furnace 200 illustrated in FIG. 9, the porous preform Pa is subjected to reciprocating movement vertically in the silica reactor core tube 201. Hereby, the two end portions of the porous preform Pa are heated more intensely than the center portion, and as a result, the internal temperature at the two end portions of the porous preform Pa increases prior to the internal temperature of the center portion.

A repetitive cycle of the porous preform Pa by the rotating-and-lifting device 204 is set at a predetermined cycle so that the internal temperature at the two end portions in the longitudinal direction is within a constant temperature difference. It is because, when the repetitive cycle is long, the porous preform Pa heated by the highest-temperature position X of the heater 202 is cooled until a next stroke, and thus, a stress is produced by a temperature difference produced at the two end portions in the longitudinal direction of the porous preform Pa. Although, in FIG. 9, the relative position is reversed immediately after the highest-temperature position X reaches the tapered portions, as long as the temperature difference at the two end portions in the longitudinal direction of the porous preform Pa is within a predetermined range, the relative position may be reversed after the highest-temperature position X reaching the tapered portions stops for a predetermined time.

If the temperature difference inside the two end portions in the longitudinal direction of the porous preform Pa is equal to or lower than 800° C., it is possible to restrain a stress from being produced. This can be achieved by making the repetitive cycle of the porous preform Pa be, for example, equal to or greater than once for an hour. In order to not apply an excessive load to the rotating-and-lifting device 204, it is preferable that the repetitive cycle of the porous preform Pa be equal to or less than 60 reciprocations for one hour.

Since the gas introduction port 205 and the gas-exhausting port 206 are provided to the silica reactor core tube 201, the porous preform Pa contained in the silica reactor core tube 201 may be dehydrated by introducing chlorine having a dehydration effect and helium being inert gas.

Figure 10:
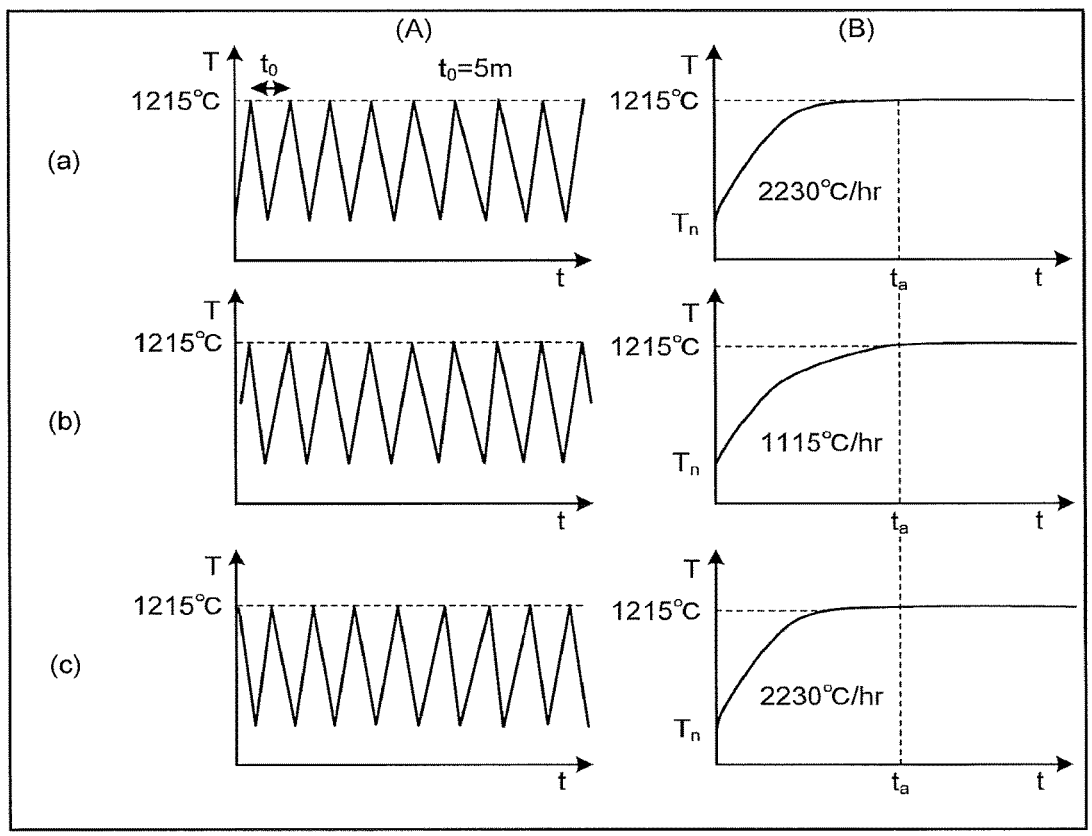
FIG. 10 is a graph illustrating examples of the temperature histories in the dehydration step according to the second embodiment.

FIG. 10 illustrates a graph illustrating examples of temperature histories of dehydration step according to the second embodiment. In the graph illustrated in FIG. 10, horizontal axes indicate time t for the dehydration step and vertical axes indicate temperature T. The temperature histories illustrated in FIG. 10 relate to (A) preform surfaces and (B) inside preforms of the porous preforms, for each of them, (a) upper stage, (b) middle stage, and (c) lower stage relating to the longitudinal direction of the porous preform are described. As illustrated in previously explained FIG. 3, temperature in (B) inside preform at the (a) upper stage and the (c) lower stage is temperature at the middle position mt between the center axis and the top surface at the position in the longitudinal direction where the outer diameter of the tapered portions becomes 50% of the outer diameter of the parallel portion, and temperature of the (B) inside preform at the (b) middle stage is a temperature at the middle position mc between the center axis and the top surface at the center position in the longitudinal direction.

As understood from the temperature histories at the (A) preform surface illustrated in FIG. 10, surface temperatures at top surfaces of the (a) upper stage, the (b) middle stage, and the (c) lower stage of the porous preform increase and decrease periodically. This is because the position of the heater 202 relative to the highest-temperature position X repeatedly moves back and forth in the longitudinal direction. The highest temperature of the heater 202 at the highest-temperature position X is 1215° C., and period $t_0$ at which it is heated to the highest temperature is at an interval of five minutes. That is, a repetitive cycle of the porous preform by the rotating-and-lifting device 204 is a period at which the heater 202 is reciprocated twelve times in an hour.

On the other hand, as understood from the temperature histories at the (B) inside preform, in the dehydration step according to the second embodiment, the internal temperatures at the (a) upper stage and the (c) lower stage of the porous preform increase prior to that of the (b) middle stage. More specifically, the internal temperatures at the (a) upper stage and the (c) lower stage of the porous preform increase from normal temperature $T_n$ to 1215° C. by a rate of 2230° C./hr, and by contrast, the (b) middle stage increases in temperature from the normal temperature $T_n$ to 1215° C. by a rate of 1115° C./hr. This is because porous layers of the (a) upper stage and the (c) lower stage of the porous preform are taper-shaped and smaller in thickness, and thus, the internal temperatures increase prior to the temperature difference of surface temperatures.

A difference of temperatures of the (B) inside preform between the (a) upper stage and the (c) lower stage, and the (b) middle stage is 600° C. at maximum, and a difference between the internal temperature at the two end portions in the longitudinal direction and the internal temperature at the center portion became zero subsequent to $t_a$=45 minutes after starting heating.

When inspecting rate of occurrence of cracking at the dehydration step having the above-described temperature history, results below were obtained. The porous preform being used for the inspection was produced by depositing a porous layer of which average bulk density is 0.65 g/cm³ at an outer periphery of a core rod of which outer diameter is 50 mm and of which length is 2000 mm by OVD method. An outer diameter of the parallel portion of the porous preform being produced is 270 mm. When conducting the dehydration step for six hours in dehydration time to this porous preform of which temperature history is described above, the rate of occurrence of cracking was equal to or lower than 0.1%, and this indicated a significant effect in comparison to Comparative Example which will be explained later.

Third Embodiment

Hereafter, a production method of an optical fiber preform and a production method of an optical fiber according to a third embodiment will be explained. However, since the third embodiment is an embodiment using the multi-stage-heating glass furnace explained in the first embodiment, FIG. 6 is referred to for omitting duplicate explanation of configuration.

A production method of an optical fiber preform and a production method of an optical fiber according to the third embodiment relate to an embodiment in which a doping step is provided between the dehydration step and the sintering step of the production method of the optical fiber preform and the production method of the optical fiber according to the first embodiment. That is, a vitrification step according to the third embodiment includes a dehydration step being a first thermal treatment step, a doping step being a second thermal treatment step, and a sintering step being a final (third) thermal treatment step.

Figure 11:
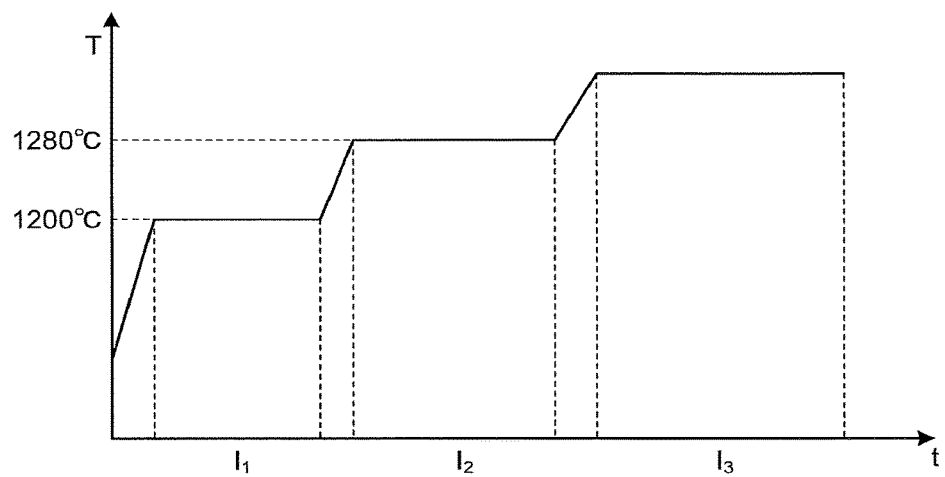
FIG. 11 is a graph illustrating examples of temperature histories of a vitrification step according to a third embodiment.

FIG. 11 is a graph illustrating an example of temperature history of a vitrification step according to the third embodiment. In the graph illustrated in FIG. 11, a horizontal axis indicates time t for the step and a vertical axis indicates temperature T. As illustrated in FIG. 11, when providing a doping step ($I_2$) between a dehydration step ($I_1$) and a sintering step ($I_3$), rate of occurrence of cracking increases because of thermal condition between the doping step and the sintering step. For example, in the example illustrated in FIG. 11, the doping step is conducted at 1280° C. after the dehydration step conducted at 1200° C. As explained previously, the sintering step is conducted at 1400° C. to 1600° C.

Herein the third embodiment, heating is conducted so that the internal temperatures at the two end portions in the longitudinal direction of the porous preform Pa increase prior to the internal temperature at the center portion in the longitudinal direction in the doping step as well between the dehydration step and the sintering step.

The gas introduction port 105 and the gas-exhausting port 106 are provided to the silica reactor core tube 101 of the multi-stage-heating vitrification furnace 100 illustrated in FIG. 6. Therefore, when doping the porous preform Pa with fluorine, gas containing fluorine including silicon tetrafluoride ($SiF_4$) or the like can be introduced into the silica reactor core tube 101.

The first heater 102, the second heater 103 and the third heater 104 of the multi-stage-heating vitrification furnace 100 illustrated in FIG. 6 may be controlled independently, and their setting temperatures and temperature-rising rate may be controlled to be set differently.

Therefore, in the doping step according to the third embodiment, when making the outputs of the first heater 102 and the third heater 104 be greater than the output of the second heater 103, the two end portions of the porous preform Pa are heated more intensely than the center portion, and gas containing fluorine including silicon tetrafluoride ($SiF_4$) or the like is introduced into the silica reactor core tube 101 from the gas introduction port 105, and thus, the porous preform Pa is doped with fluorine.

More specifically, the surface temperature of the porous preform Pa in the doping step according to the third embodiment increases from, for example, 1200° C. to 1280° C. by a rate of 300° C./hr. The internal temperatures at the upper stage and the lower stage of the porous preform Pa increase to 1280° C. at a rate of 200° C./hr, and by contrast, the internal temperature at the middle stage increases at a rate of 150° C./hr. Lapse of time subsequent to heating to 1280° C. is two hours.

Since the heating is conducted in the doping step according to the above-described third embodiment so that the internal temperatures at the two end portions in the longitudinal direction of the porous preform Pa increase prior to the internal temperature at the center portion in the longitudinal direction, rate of occurrence of cracking is restrained at equal to or lower than 0.1%.

Effects of the present disclosure will be verified by comparing the embodiments according to the present disclosure and the comparative examples below.

Comparative Example 1

Figure 12:
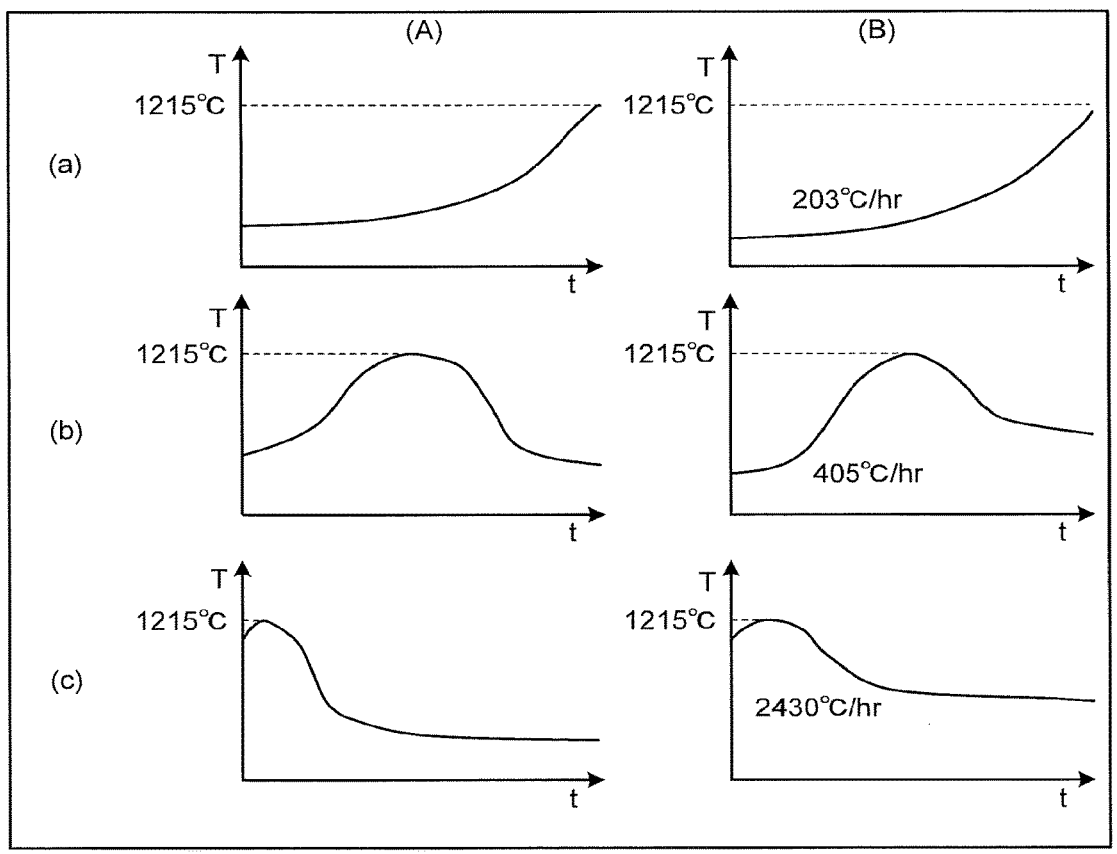
FIG. 12 is a graph illustrating examples of temperature history in a case of conducting the dehydration step in one stroke in the stroke-type vitrification furnace.

FIG. 12 illustrates a graph illustrating examples of temperature histories when making a porous preform pass a highest-temperature position only once from a lower end in a stroke-type vitrification furnace to conduct a dehydration step. In the graph illustrated in FIG. 12, horizontal axes indicate time t for the dehydration step and vertical axes indicate temperature T. The temperature histories illustrated in FIG. 12 relate to (A) preform surfaces and (B) inside preforms of the porous preforms, for each of them, (a) upper stage, (b) middle stage, and (c) lower stage relating to the longitudinal direction of the porous preform are described. Herein a temperature measurement position at the (B) inside preform is identical to those of the first embodiment and the second embodiment.

As illustrated in FIG. 12, in a dehydration step according to the related technology, temperatures of the (A) preform surface are heated in an order of the (c) lower stage, the (b) middle stage, and the (a) upper stage. This is caused by only one time of movement of the highest-temperature position from a lower end to an upper end in a stroke-type vitrification furnace.

Moreover, since heating is conducted in the dehydration step according to the related technology by making the highest-temperature position pass only once, temperatures of the (B) inside preform as well are heated in an order of the (c) lower stage, the (b) middle stage, and the (a) upper stage. As a result, when the temperature of the (B) inside preform at the (a) upper stage reaches the highest position, the temperature of the (B) inside preform at the (c) lower stage is decreased inevitably. The temperature difference between the two ends in the longitudinal direction of the porous preform causes a stress to be produced, and thus, resulting in a cracking being produced.

In the above-described dehydration step, temperature-rising rates of the (B) inside preform at the (a) upper stage, the (b) middle stage, and the (c) lower stage are 203° C./hr, 405° C./hr, and 2430° C./hr respectively. In the production method of the optical fiber preform and the production method of the optical fiber into which the dehydration step having the above-described condition is incorporated, rate of occurrence of cracking is equal to or greater than 1.0%.

As clearly understood from a comparison of the above-described related technology with the above-explained second embodiment, the rate of occurrence of cracking is equal to or greater than 1.0% in the example of the related technology, and by contrast, the rate of occurrence of cracking is equal to or lower than 0.1% in the second embodiment, thus, the rate of occurrence of cracking is restrained by equal to or less than one fourth.

Comparative Example 2

Figure 13:
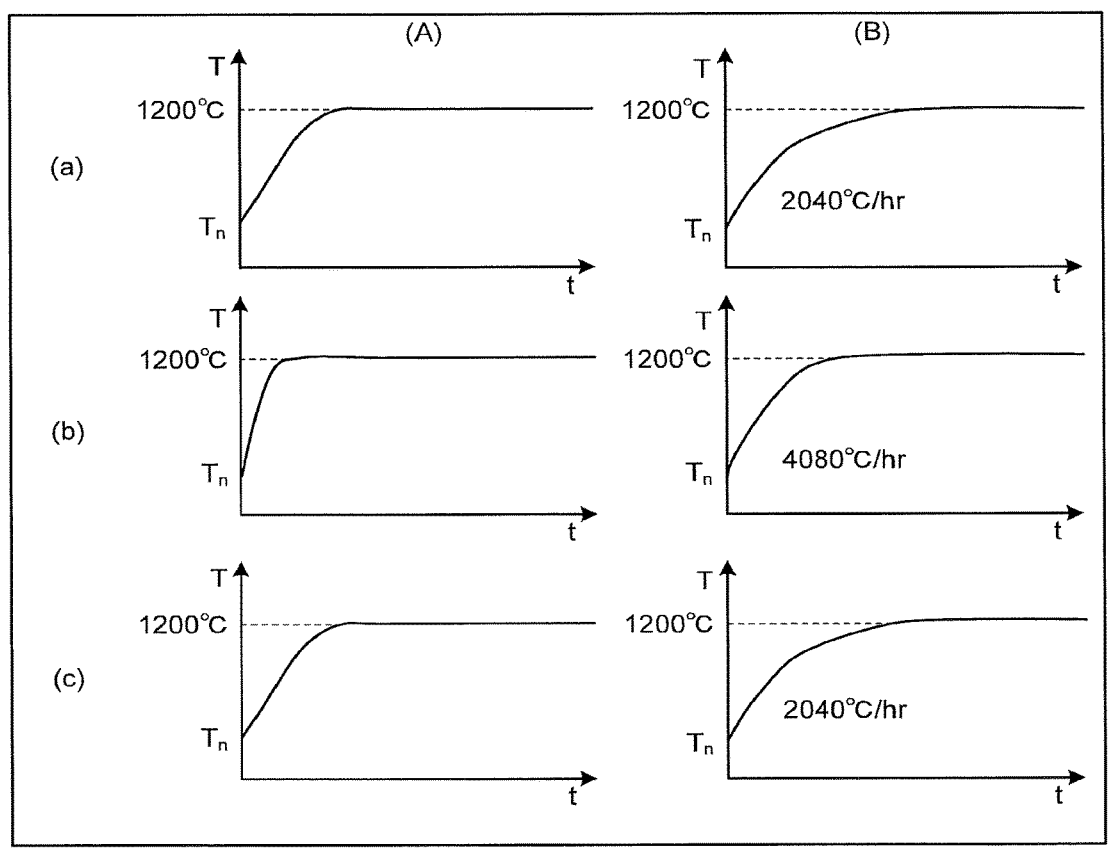
FIG. 13 is a graph illustrating examples of temperature histories in a case of conducting the dehydration step by each stage of heater at identical outputs by the multi-stage-heating vitrification furnace.

FIG. 13 illustrates a graph illustrating examples of temperature histories when conducting a dehydration step by a heater of each stage of a multi-stage-heating vitrification furnace at an identical output. In the graph illustrated in FIG. 13, horizontal axes indicate time t for the dehydration step and vertical axes indicate temperature T. In addition, $T_n$ indicates normal temperature. The temperature histories illustrated in FIG. 13 relate to (A) preform surfaces and (B) inside preforms of the porous preforms, for each of them, (a) upper stage, (b) middle stage, and (c) lower stage relating to the longitudinal direction of the porous preform are described. Herein a temperature measurement position at the (B) inside preform is identical to those of the first embodiment and the second embodiment.

As illustrated in FIG. 13, in a dehydration step according to related technology, temperatures of the (A) preform surface are heated in an order of the (c) lower stage, the (b) middle stage, and the (a) upper stage. This is caused by a plurality of heaters being heated simultaneously at an identical output when conducting a dehydration step according to a related technology in a multi-stage-heating vitrification furnace.

On the other hand, temperatures of the (B) inside preform increase in temperature at the (b) middle stage prior to those of the (a) upper stage and the (c) lower stage. This is because there are low-temperature areas at an upper region of the (a) upper stage and at a lower region of the (c) lower stage.

In the above-described dehydration step, temperature-rising rates of the (B) inside preform at the (a) upper stage and the (c) lower stage are 2040° C./hr, and temperature-rising rate of the (B) inside preform at the (b) middle stage is 4080° C./hr. In the production method of the optical fiber preform and the production method of the optical fiber into which the dehydration step having the above-described condition is incorporated, rate of occurrence of cracking is equal to or greater than 0.4%.

As clearly understood from a comparison of the above-described related technology with the above-explained first embodiment, the rate of occurrence of cracking is equal to or greater than 0.4% in the example of the related technology, and by contrast, the rate of occurrence of cracking is equal to or lower than 0.1% in the first embodiment, thus, the rate of occurrence of cracking is restrained by equal to or less than one fourth.

As described above, the production method of the optical fiber preform and the production method of the optical fiber according to the present disclosure are suitable for use in producing an optical fiber preform and an optical fiber with reduced cracking.

According to The production method of the optical fiber preform and the production method of the optical fiber of the present disclosure, it is possible to obtain an effect capable of restraining a cracking from being produced.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A production method of an optical fiber preform, comprising:
    forming a porous preform by depositing silica particles at an outer periphery of a core rod; and
    vitrifying the porous preform by conducting thermal treatment steps, wherein
    at a first thermal treatment step that is an initial thermal treatment step of the thermal treatment steps, the porous preform is heated so that internal temperatures at two end portions in a longitudinal direction of the porous preform increase before an internal temperature of a center portion in the longitudinal direction increases,
    a first thermal treatment step is conducted by a device including heaters arranged in the longitudinal direction of the porous preform, and
    outputs of the heaters heating the two end portions in the longitudinal direction increase before an output of a heater heating the center portion in the longitudinal direction increases.

2. The production method of an optical fiber preform according to claim 1, wherein the porous preform is heated so that a temperature difference between the internal temperatures in the longitudinal direction of the porous preform is not higher than 800° C.

3. The production method of an optical fiber preform according to claim 1, wherein, at the first thermal treatment step, a temperature-rising rate of internal temperatures at the two end portions in the longitudinal direction of the porous preform is not higher than 6000° C. per hour.

4. The production method of an optical fiber preform according to claim 1, wherein, at the first thermal treatment step, the porous preform is subjected to a thermal treatment in an atmosphere containing inert gas and halogen gas at a temperature lower than 1400° C.

5. The production method of an optical fiber preform according to claim 1, wherein, at a final thermal treatment step of the thermal treatment steps, the porous preform is subjected to a thermal treatment in an atmosphere containing inert gas at a temperature higher than 1400° C.

6. The production method of the optical fiber preform according to claim 1, wherein at the thermal treatment steps other than a final thermal treatment step, the porous preform is heated so that the internal temperatures of the two end portions in the longitudinal direction of the porous preform increase before the internal temperature of the center portion in the longitudinal direction increases.

7. A production method of an optical fiber, comprising:
    drawing an optical fiber preform produced by a production method of an optical fiber preform including:
    forming a porous preform by depositing silica particles at an outer periphery of a core rod; and
    vitrifying the porous preform by conducting thermal treatment steps, wherein
    at a first thermal treatment step that is an initial thermal treatment step of the thermal treatment steps, the porous preform is heated so that internal temperatures at two end portions in a longitudinal direction of the porous preform increase before an internal temperature of a center portion in the longitudinal direction increases,
    the first thermal treatment step is conducted by a device including heaters arranged in the longitudinal direction of the porous preform, and
    outputs of the heaters heating the two end portions in the longitudinal direction increase before an output of a heater heating the center portion in the longitudinal direction increases.

8. The production method of an optical fiber according to claim 7, wherein the porous preform is heated so that a temperature difference between the internal temperatures in the longitudinal direction of the porous preform is not higher than 800° C.

9. The production method of an optical fiber according to claim 7, wherein, at the first thermal treatment step, a temperature-rising rate of internal temperatures at the two end portions in the longitudinal direction of the porous preform is not higher than 6000° C. per hour.

10. The production method of an optical fiber according to claim 7, wherein, at the first thermal treatment step, the porous preform is subjected to a thermal treatment in an atmosphere containing inert gas and halogen gas at a temperature lower than 1400° C.

11. The production method of an optical fiber according to claim 7, wherein, at a final thermal treatment step of the thermal treatment steps, the porous preform is subjected to a thermal treatment in an atmosphere containing inert gas at a temperature higher than 1400° C.

12. The production method of an optical fiber according to claim 7, wherein at the thermal treatment steps other than a final thermal treatment step, the porous preform is heated so that the internal temperatures of the two end portions in the longitudinal direction of the porous preform increase before the internal temperature of the center portion in the longitudinal direction increases.

13. A production method of an optical fiber preform, comprising:
    forming a porous preform by depositing silica particles at an outer periphery of a core rod; and
    vitrifying the porous preform by conducting thermal treatment steps, wherein
    at a first thermal treatment step that is an initial thermal treatment step of the thermal treatment steps, the porous preform is heated so that internal temperatures at two end portions in a longitudinal direction of the porous preform increase before an internal temperature of a center portion in the longitudinal direction increases, wherein
    the first thermal treatment step is conducted by a device including a heater configured to heat a partial section in the longitudinal direction of the porous preform,
    a position of the heater relative to the porous preform in the longitudinal direction repeatedly moves back and forth at a predetermined cycle, and
    at the thermal treatment steps other than a final thermal treatment step, the porous preform is heated so that the internal temperatures of the two end portions in the longitudinal direction of the porous preform increase before the internal temperature of the center portion in the longitudinal direction increases.

* * * * *